(12) United States Patent
Igoe

(10) Patent No.: US 10,710,811 B2
(45) Date of Patent: Jul. 14, 2020

(54) MATERIAL UNLOADER APPARATUS, SYSTEMS AND METHODS

(71) Applicant: Superior Industries, Inc., Morris, MN (US)

(72) Inventor: Colum Igoe, Myaree (AU)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/484,638

(22) PCT Filed: Feb. 8, 2018

(86) PCT No.: PCT/US2018/017440
§ 371 (c)(1),
(2) Date: Aug. 8, 2019

(87) PCT Pub. No.: WO2018/148421
PCT Pub. Date: Aug. 16, 2018

(65) Prior Publication Data
US 2019/0375598 A1    Dec. 12, 2019

Related U.S. Application Data

(60) Provisional application No. 62/456,508, filed on Feb. 8, 2017.

(51) Int. Cl.
*B65G 41/00* (2006.01)
*B65G 65/02* (2006.01)
*B65G 67/24* (2006.01)
*B65G 69/30* (2006.01)

(52) U.S. Cl.
CPC ........ *B65G 41/008* (2013.01); *B65G 41/002* (2013.01); *B65G 65/02* (2013.01); *B65G 67/24* (2013.01); *B65G 69/30* (2013.01)

(58) Field of Classification Search
None
See application file for complete search history.

(56) References Cited

U.S. PATENT DOCUMENTS

| 671,122 | A | * | 4/1901 | White | B65G 67/00 414/356 |
|---|---|---|---|---|---|
| 5,964,566 | A | * | 10/1999 | Stewart | B65G 67/24 198/302 |
| 7,090,066 | B2 | * | 8/2006 | Kirsch | B65G 47/18 198/302 |
| 7,424,943 | B2 | * | 9/2008 | Gausman | B65G 67/24 198/311 |
| 10,053,308 | B2 | * | 8/2018 | Toews | B65G 47/18 |
| 2004/0136817 | A1 | * | 7/2004 | Kirsch | B65G 47/18 414/376 |
| 2007/0089966 | A1 | * | 4/2007 | Gausman | B65G 67/24 198/311 |
| 2016/0052732 | A1 | * | 2/2016 | Toews | B65G 47/18 198/302 |

* cited by examiner

*Primary Examiner* — William R Harp
(74) *Attorney, Agent, or Firm* — Todd R. Fronek; Larkin Hoffman Daly & Lindgren, Ltd.

(57) ABSTRACT

Truck unloader apparatus, systems and methods are disclosed for unloading and/or conveying aggregate material. In some embodiments, a load-bearing truss of the truck unloader includes a ramp in a road transport configuration.

15 Claims, 10 Drawing Sheets grate 352 may be comprised of any configuration of bars or other structure allowing at least some material to fall therethrough. In some embodiments, the grate 352 may be replaced or supplemented with an opening allowing material to fall therethrough. It should be appreciated that various truck unloader embodiments could be used to unload belly-dump trucks (e.g., by driving over the unloader ramps and positioning one or more dump gates over the grate) or end-tipping or side-tipping dump trucks, or rail cars, etc. Selective raising of ramps 410 (e.g., using actuators as described herein, or manually, etc.) optionally causes material collected on the ramps 410 to move (e.g., by gravity) onto the grate 352. In some embodiments, one or more sidewalls 402 optionally provided on ramps 410 retain at least some material on the ramps 410 during unloading for transfer onto the grate 352; in some embodiments, one or more sidewalls 302 of the ground frame 300 optionally cooperate with the sidewalls 402 to guide material from the ramps 410 onto the grate 352 when the ramps are at least partially lifted.

MATERIAL UNLOADER APPARATUS, SYSTEMS AND METHODS

BACKGROUND

Unloaders are used in some applications to receive materials unloaded from a transport apparatus. In some embodiments, conveyor apparatus are used to convey materials unloaded from the transport apparatus.

DESCRIPTION

Figure 1:
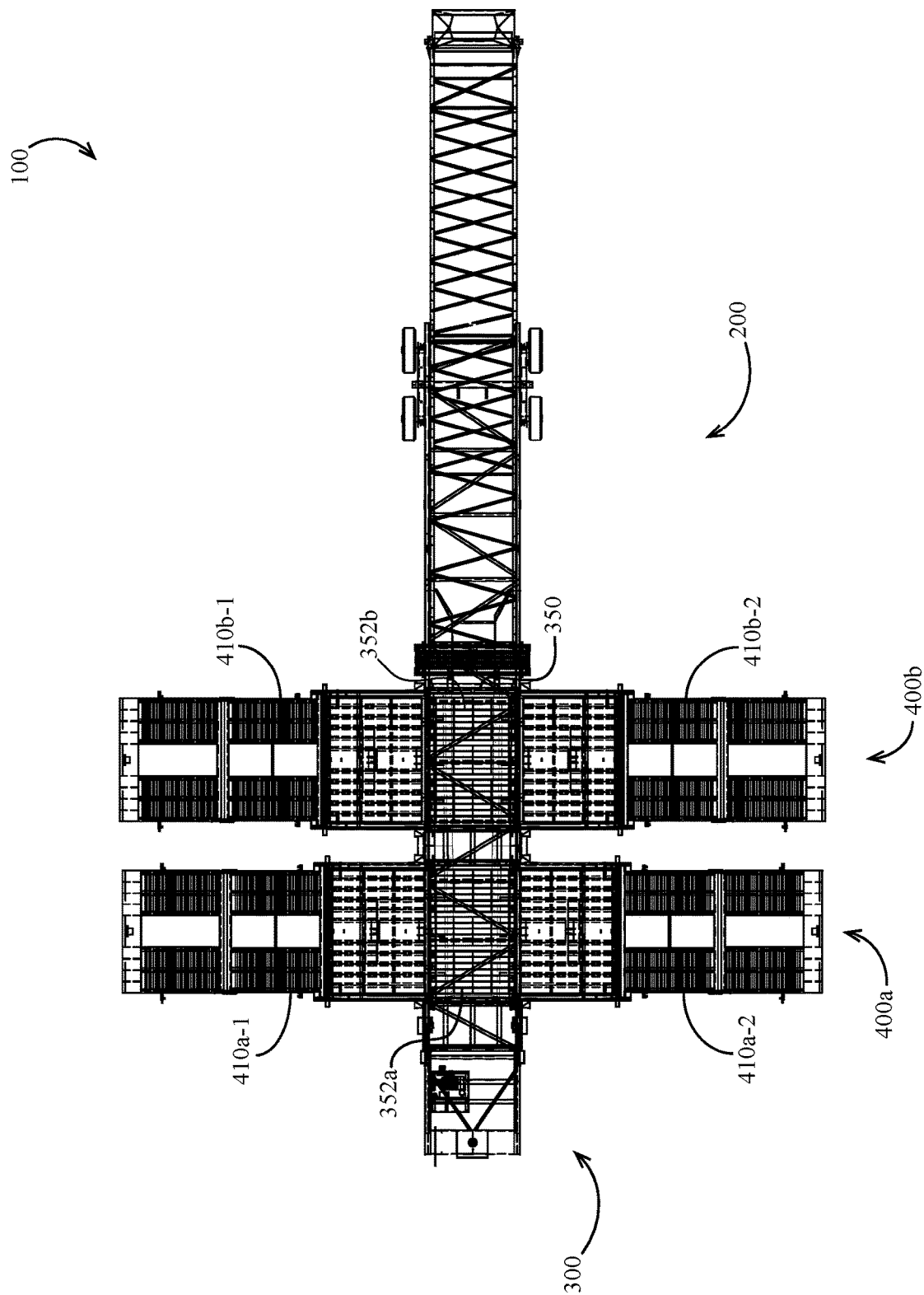
FIG. 1 is a plan view of an embodiment of a truck unloader in an operating configuration.

Referring to the drawings, wherein like reference numerals designate identical or corresponding parts throughout the several views, an embodiment of a truck unloader 100 is illustrated. The truck unloader 100 has a transport configuration and an operational configuration. The truck unloader 100 optionally comprises one or more transversely extending ramp assemblies 400, each including one or more ramps 410 which are optionally lowered to (or adjacent to) the ground or other support in the operational configuration and optionally raised in the transport configuration. In the transport configuration, a truss 500 optionally partially transfers the load of the truck unloader 100. In one embodiment, the truss 500 optionally includes at least one longitudinally extending portion (e.g., beam 430) of the ramp assembly 400 and establishes a load path including the at least on longitudinally extending portion when a compressive load is placed on the truss 500. It should be appreciated that in the various embodiments described herein, the beam 430 may comprise and/or be replaced with any suitable structure such as a full beam, partial beam, angle, plate, tube, etc.

The truck unloader 100 includes a ground frame 300 (which may be supported on the ground or on other structure according to various embodiments and implementations), which optionally pivotally supports one or more transversely extending ramp assemblies 400 (e.g., two ramp assemblies 400a and 400b) for at least partially supporting a vehicle (e.g., truck, train car or other vehicle) thereon. A grate 352 is optionally disposed on a portion 350 (e.g., central portion, upper portion, etc.) of the ground frame 300 for receiving material dumped by the vehicle therethrough. The grate 352 optionally at least partially supports a vehicle driven over one or more ramps. In some embodiments, the grate 352 may be comprised of any configuration of bars or other structure allowing at least some material to fall therethrough. In some embodiments, the grate 352 may be replaced or supplemented with an opening allowing material to fall therethrough. It should be appreciated that various truck unloader embodiments could be used to unload belly-dump trucks (e.g., by driving over the unloader ramps and positioning one or more dump gates over the grate) or end-tipping or side-tipping dump trucks, or rail cars, etc. Selective raising of ramps 410 (e.g., using actuators as described herein, or manually, etc.) optionally causes material collected on the ramps 410 to move (e.g., by gravity) onto the grate 352. In some embodiments, one or more sidewalls 402 optionally provided on ramps 410 retain at least some material on the ramps 410 during unloading for transfer onto the grate 352; in some embodiments, one or more sidewalls 302 of the ground frame 300 optionally cooperate with the sidewalls 402 to guide material from the ramps 410 onto the grate 352 when the ramps are at least partially lifted.

Figure 2:
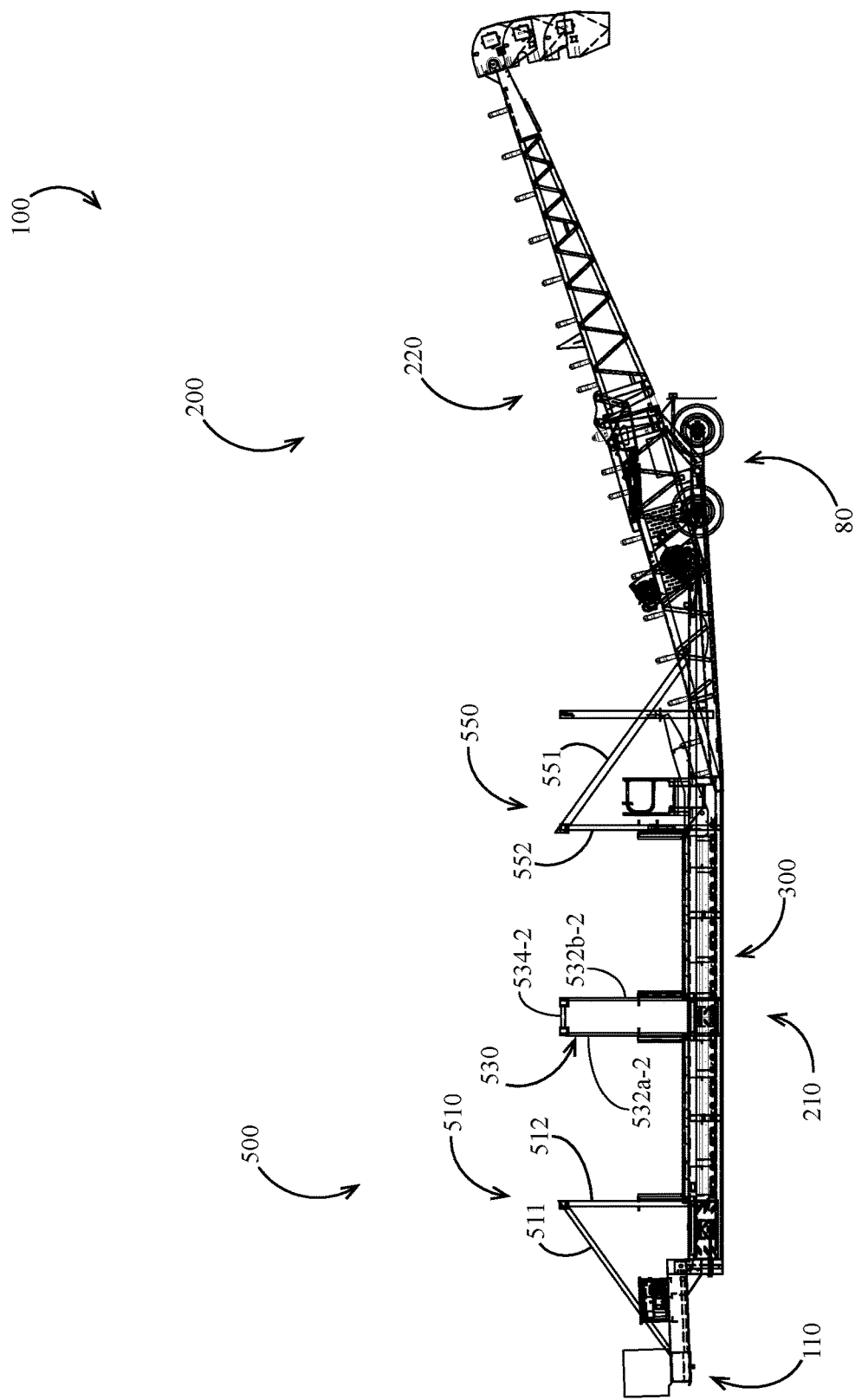
FIG. 2 is a side elevation view of the truck unloader of FIG. 1 in an operating configuration.
Figure 5:
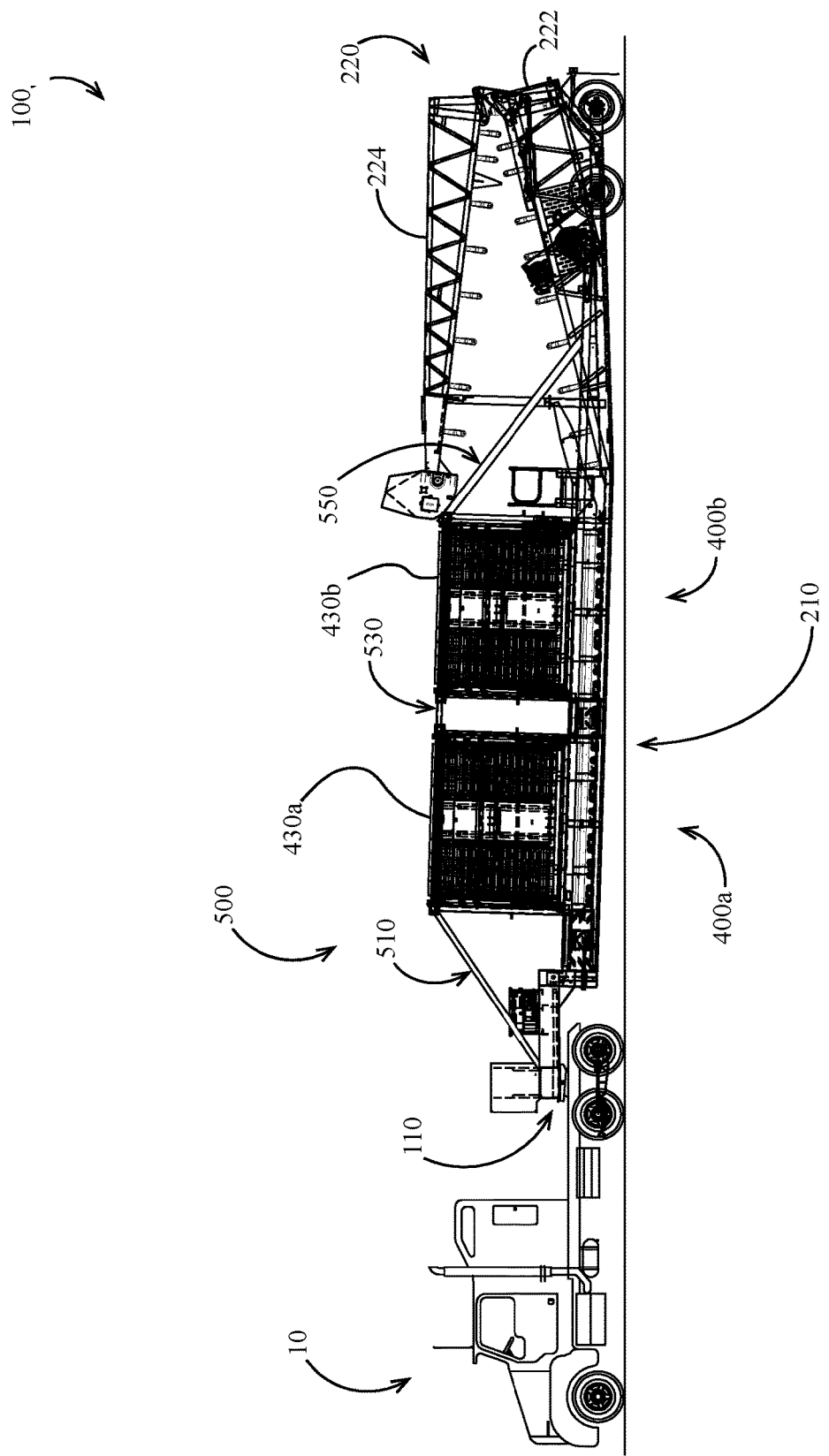
FIG. 5 is a side elevation view of the truck unloader of FIG. 1 in a transport configuration.

Referring to FIGS. 2 and 5, material dumped by the vehicle (e.g., through grate 352) is optionally received on a conveyor section 210 disposed beneath and/or inside the ground frame 300. The conveyor section 210 is optionally a portion of a conveyor 200 disposed to convey materials from the vehicle away from (and optionally upward relative to) the ground frame 300. The conveyor 200 and ground frame 300 are optionally mechanically coupled to one another.

Figure 3:
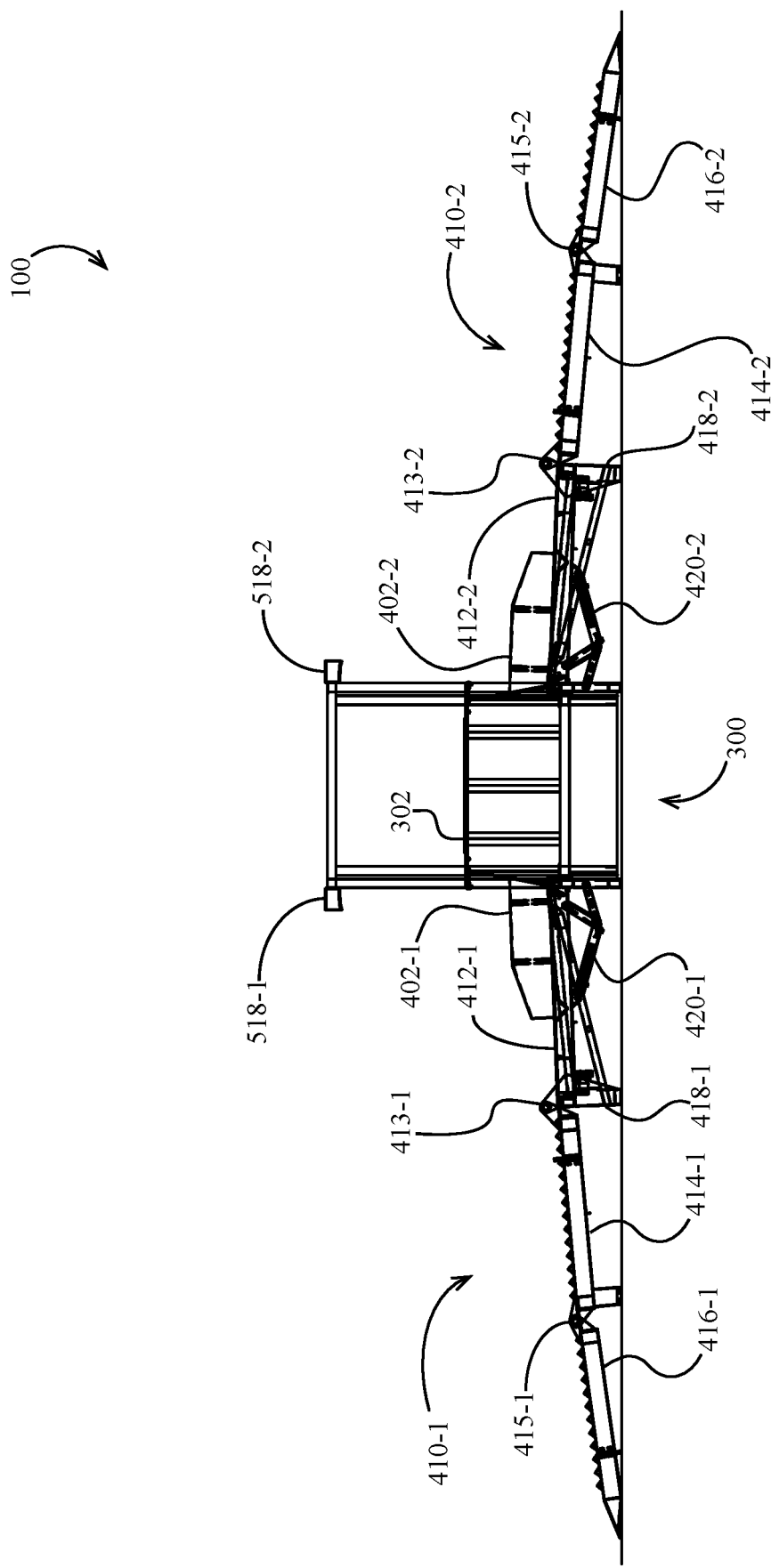
FIG. 3 is a partial rear elevation view of the truck unloader of FIG. 1 in an operating configuration.
Figure 4:
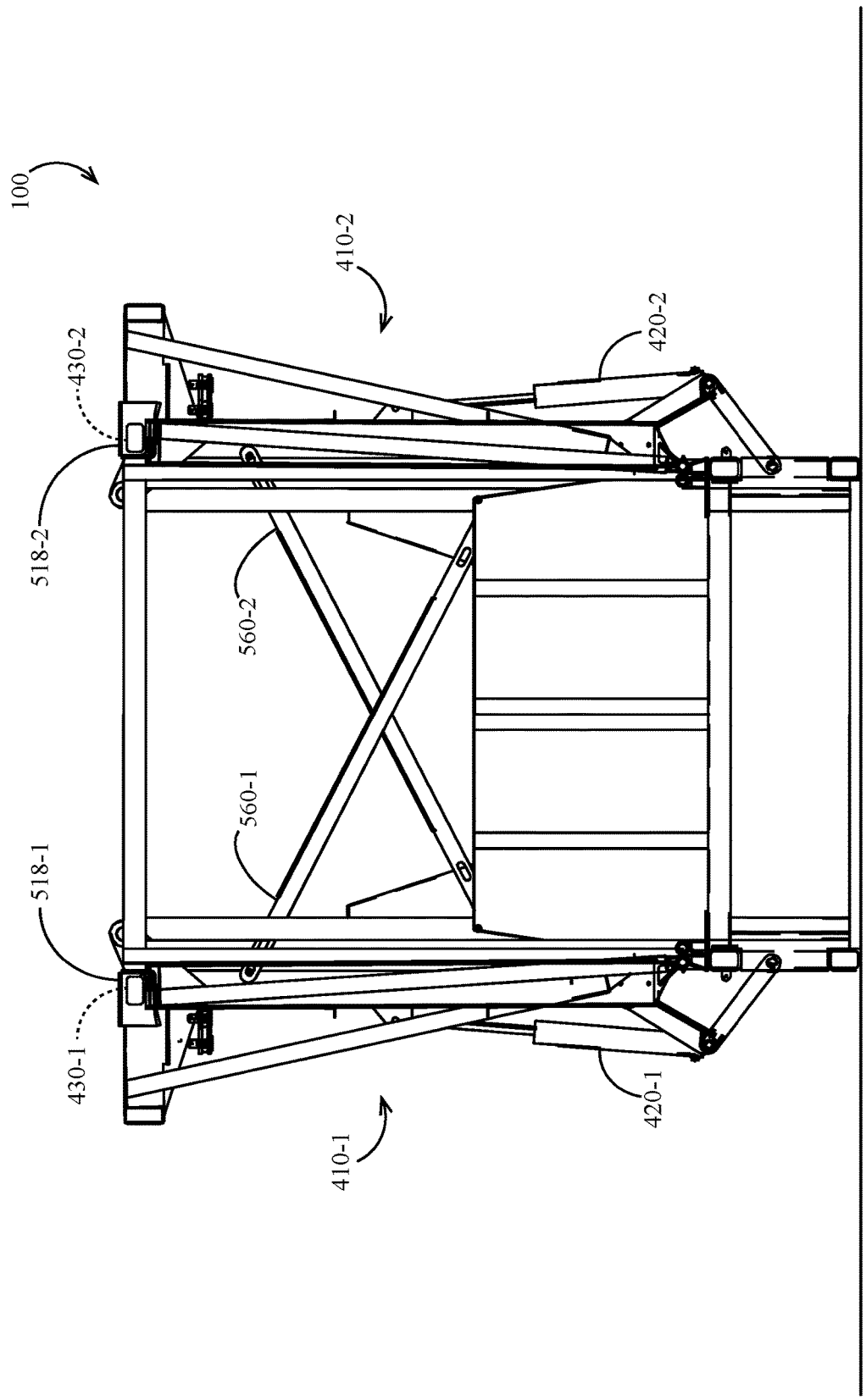
FIG. 4 is a partial rear elevation view of the truck unloader of FIG. 1 in a transport configuration.

Referring to FIG. 3, each ramp assembly 400 optionally comprises a left ramp 410-1 pivotally coupled to the ground frame 300 and a right ramp 410-2 pivotally coupled to the ground frame 300. Each of the left and right ramps 410 optionally include an inboard ramp 412 pivotally coupled to the ground frame 300. One or more actuators 420 (e.g., hydraulic actuators) is optionally pivotally coupled to the ground frame at a first end thereof and optionally pivotally coupled to the inboard ramp 412 for raising and lowering the inboard ramp 412 between a transport position in which the ramp 412 is raised and an operating position in which the ramp 412 is lowered to the ground or onto a support frame 418 according to various embodiments. Each ramp 410 optionally includes a first outboard ramp 414 coupled (e.g., removably coupled such as by one or more pins) to the inboard ramp 412 at a connection 413. Each ramp 410 optionally includes a second outboard ramp 416 coupled (e.g., removably coupled such as by one or more pins) to the first outboard ramp 414 at a connection 415.

Comparing FIG. 2 and FIG. 5, in the transport position of FIG. 5, a truss 500 optionally bears and/or transmits at least part of the load of the truck unloader 100 to a vehicle 10 (e.g., to a pivot 110 pivotally coupled to the vehicle 10). Additionally, in the transport configuration, the unloader 100 is optionally supported on the vehicle 10 and on a wheel assembly 80 which is optionally supported on the ground frame 300 and/or on the forward portion 220 of the conveyor. In the operational configuration of FIG. 2, the unloader 100 (e.g., the ground frame thereof) is optionally supported on the ground and/or on other structure beneath the ground frame. The truss 500 optionally includes a rearward truss section 510 comprising one or more rearward angled supports 511 (e.g., one or more full beams, partial beams, plates, angles, or other structure which may be referred to as diagonals, struts or other terminology), each angled support 511 coupling the ground frame 300 to a respective vertical support 512 (e.g., one or more full beams, partial beams, plates, angles, or other structure which may be referred to as posts, struts or other terminology). In some embodiments, two rear vertical supports 512 are joined by one or more lateral or angled supports 560. The vertical support 512 is optionally coupled to the ground frame 300. In the transport position, a longitudinally extending beam 430a which is coupled to the ramp 410a is optionally selectively positioned and optionally secured between the vertical support 512 and a central truss section 530. The truss 500 (e.g., the vertical supports 512, 532, 552 and/or angled supports 511, 531, 551 described herein) is at least partially mounted to and/or supported on the ground frame 300 such as by welding and/or by fasteners.

Figure 7:
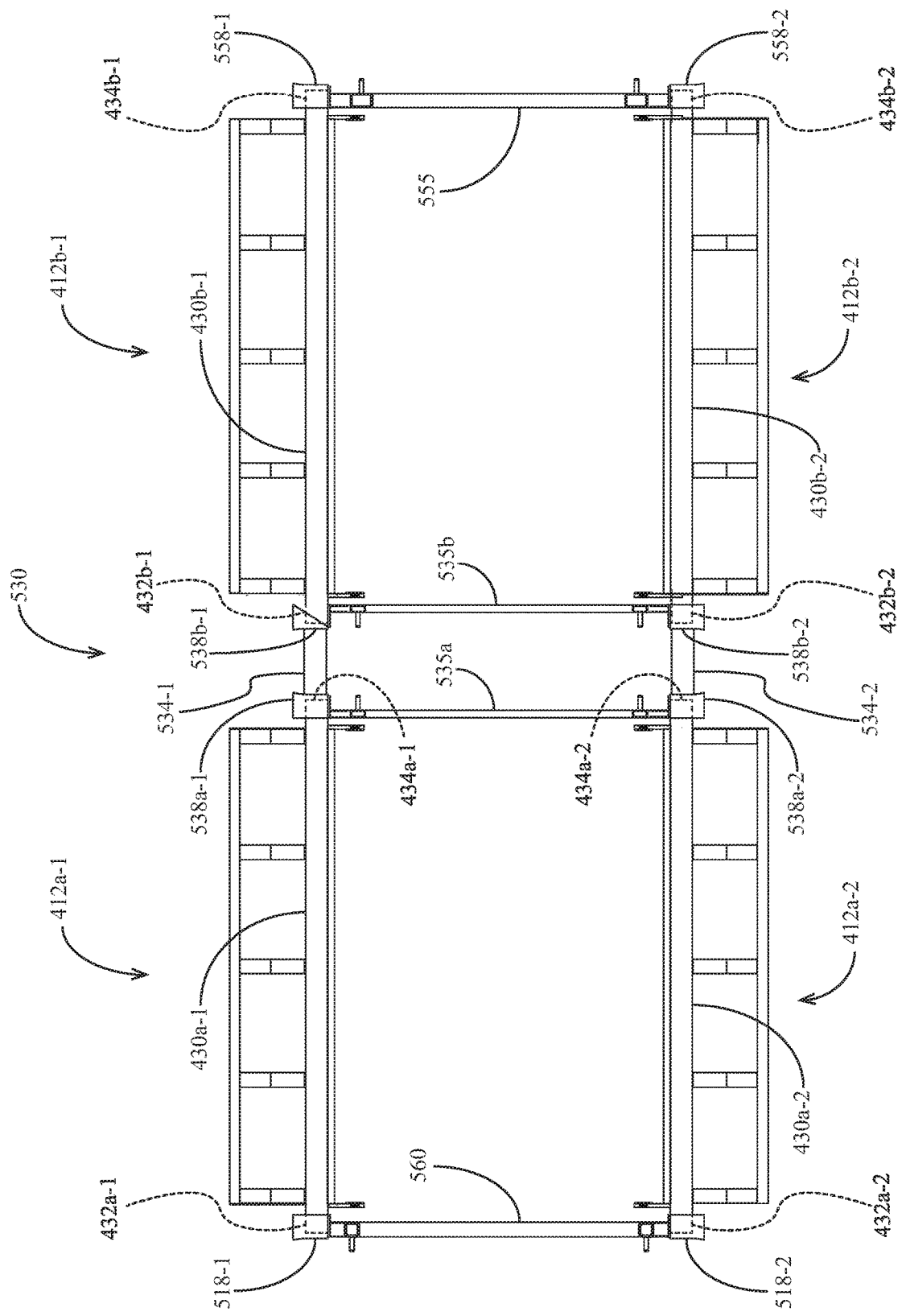
FIG. 7 is a partial plan view of the truck unloader of FIG. 1 in a transport configuration.

Referring to FIGS. 2 and 7, in some embodiments the central truss section 530 optionally comprises a left rearward vertical support 532a-1 and a right rearward vertical support 532b-1, the left and right vertical supports being joined by one or more lateral or angled supports 535a. In some embodiments the central truss section 530 optionally comprises a left rearward vertical support 532a-2 and a right rearward vertical support 532b-2, the left and right vertical supports being joined (e.g., at an upper end thereof) by one or more lateral or angled supports 535b.

Referring to FIGS. 2 and 7, in some embodiments the central truss section 530 optionally comprises a longitudinally extending (or in other embodiments angled) support 534-2 joining the vertical supports 532a-2 and 532b-2. In some embodiments the central truss section 530 optionally comprises a longitudinally extending (or in other embodiments angled) support 534-1 joining the vertical supports 532a-1 and 532b-2.

In the transport position, a longitudinally extending beam 430b which is optionally coupled to the ramp 410b is optionally secured (e.g., by a latch or other mechanism) between the central truss section 530 and a vertical support 552 (e.g., one or more full beams partial beams, plates, angles, or other structure which may be referred to as posts, struts or other terminology). The truss 500 optionally comprises a forward truss section 550 optionally comprising one or more angled supports 551 (e.g., one or more full beams, partial beams, plates, angles, or other structure which may be referred to as diagonals, struts or other terminology) coupling the ground frame 300 (and/or conveyor 200) to the vertical support 552. In some embodiments, left and right vertical supports 552 are joined by angled or lateral supports 555. A load imposed on the forward truss section 550 (e.g., on the forward angled support 551 and/or the vertical support 552) in the transport configuration is optionally at least partially transmitted to the rearward truss section 510 (e.g., rearward angled support 511 and/or the vertical support 512) via the beam 430a and/or beam 430b. As a result, a load path through the truss 500 includes the forward truss section 550, the beam 430a, the beam 430b and the rearward truss section 510.

To reconfigure into the operational position, the beams 430a and/or beam 430b are optionally separated from (e.g., pivoted away from, selectively decoupled from, etc.) the truss 500 for lowering the ramps 410a, 410b to a lowered position. Additionally, one or more pivoting cross-supports 560 (e.g., arms, plates, beams, angles, etc.) may selectively secure opposing sides of the ramp assembly 400 (e.g., ramps 410a, 410b) to one another and may be selectively decoupled to lower the ramps 410a, 410b into the operational position.

In the transport position, a forward portion 220 of the conveyor 200 is optionally folded to reduce an overall length thereof. For example, a forward frame 224 is optionally pivotally coupled to a rearward frame 222 such that the forward frame 224 can be folded rearward to a position generally above the rearward frame 222.

Referring to FIG. 7, in some embodiments pockets 518-1, 518-2 are optionally supported on the rear truss section 510 (e.g., an upper end thereof). The central truss section 530 optionally supports rear pockets 538a-1, 538a-2 and forward pockets 538b-1, 538b-2 (e.g., at an upper end thereof). In some embodiments one or more of the pockets described herein may comprise any structure including a v-shape, a flat surface or other surface for contacting a portion of a ramp.

In the transport configuration, a first end 432a-1 of beam 430a-1 is optionally positioned at least partially inside of pocket 518-1 and a second end 434a-1 of beam 430a-1 is optionally positioned at least partially inside of pocket 538a-1.

In the transport configuration, a first end 432a-2 of beam 430a-2 is optionally positioned at least partially inside of pocket 518-2 and a second end 434a-2 of beam 430a-2 is optionally positioned at least partially inside of pocket 538a-2.

In the transport configuration, a first end 432b-1 of beam 430b-1 is optionally positioned at least partially inside of pocket 538b-1 and a second end 434b-1 of beam 430b-1 is optionally positioned at least partially inside of pocket 558-1.

In the transport configuration, a first end 432b-2 of beam 430b-2 is optionally positioned at least partially inside of pocket 538b-2 and a second end 434b-2 of beam 430b-1 is optionally positioned at least partially inside of pocket 558-2.

As may be seen in FIG. 7, when the truss 500 is not deflected, there is optionally a gap (e.g., a small gap, a gap smaller than the width of the supports) between each ends of each beam 430 and an adjacent surface of each associated pocket. Thus in the undeflected condition, the ramps 410 are free to pivot relative to the rest of the truss 500 (e.g., for reconfiguring between the transport and operational configurations). When the truss 500 is deflected (e.g., under a load caused by at least partially supporting the pivot 110 on the vehicle 10 for transport, or otherwise supporting the unloader 100 on a vehicle for transport) the gaps between the ends of each beam and the associated pockets are optionally closed such that the load (e.g., compressive load) on the truss 500 is transmitted at least partially through the beams 430. In other embodiments, the beams 430 may additionally or alternatively be selectively secured (e.g., pinned, locked, latched, etc.) to the remainder of the truss 500 in the transport configuration.

Figure 6:
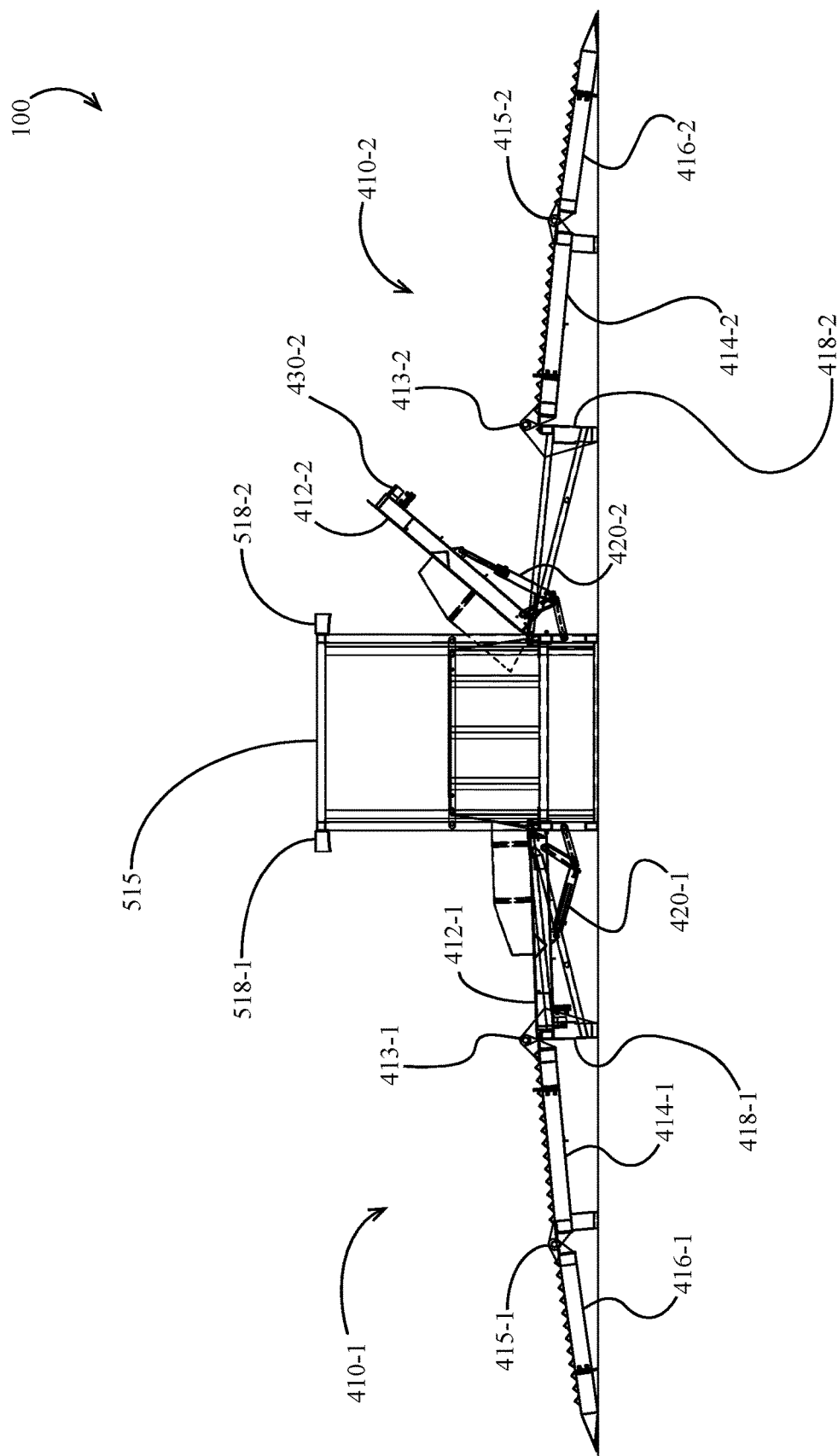
FIG. 6 is a rear elevation view of the truck unloader of FIG. 1 in an intermediate configuration.
Figure 8A:
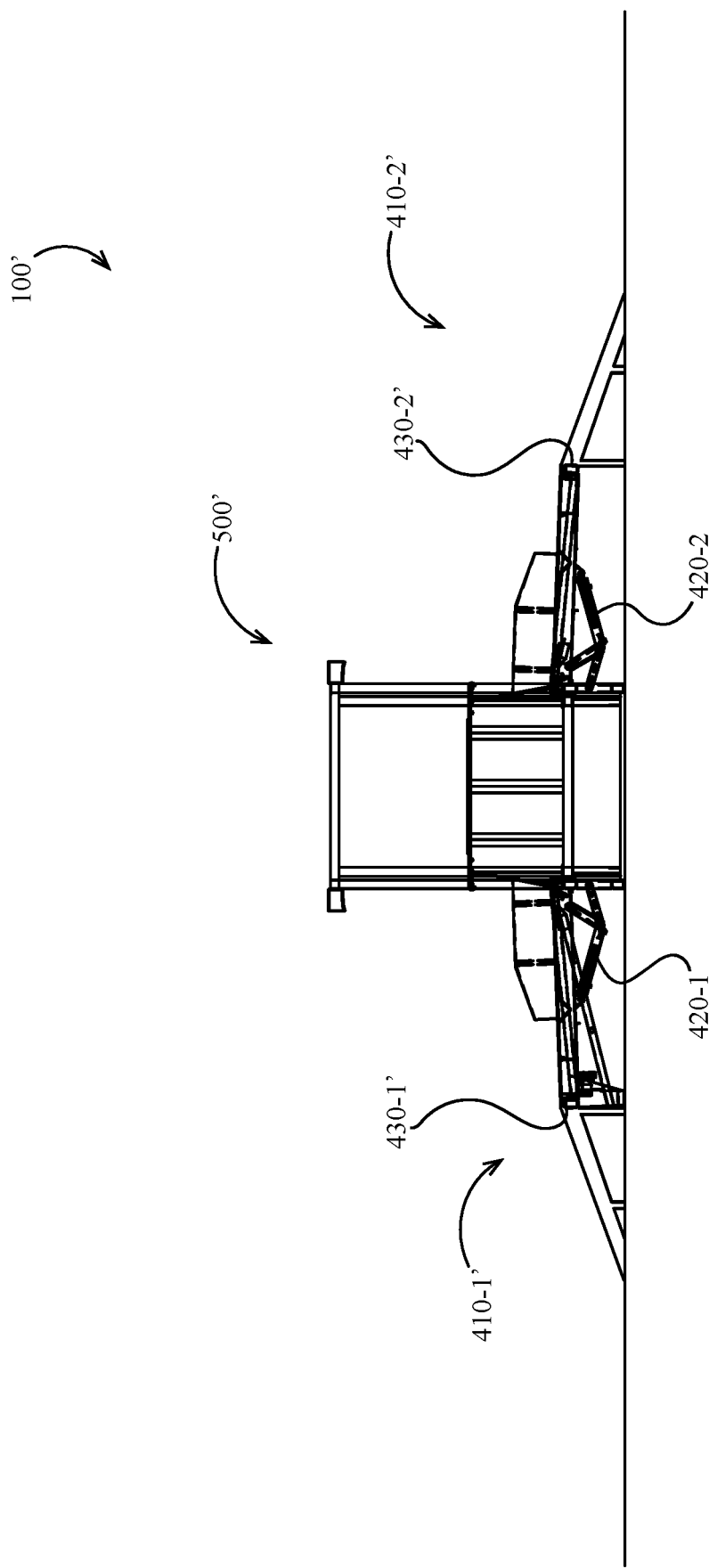
FIG. 8A is a partial rear elevation view of another embodiment of a truck unloader in an operational configuration.
Figure 8B:
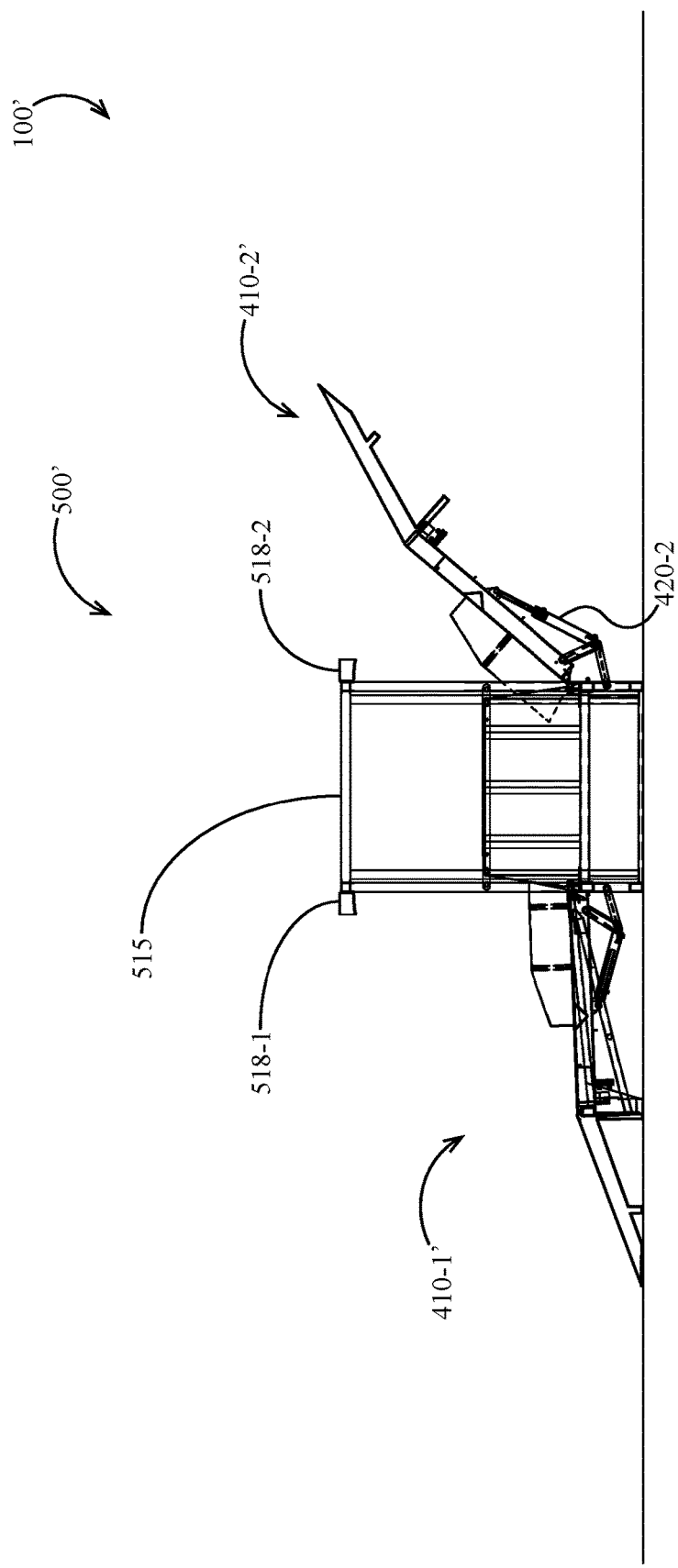
FIG. 8B is a partial rear elevation view of the truck unloader of FIG. 8A in an intermediate configuration.

Comparing FIG. 3 and FIG. 6, the inboard ramp 412 is optionally selectively lifted (e.g., pivoted) off of the support frame 418 (or off the ground in some embodiments). In other embodiments such as the truck unloader 100' of FIGS. 8A and 8B, a ramp 410' is lifted from a lowered position (FIG. 8A) in which a can optionally drive over the ramp 410' and an intermediate raised position (FIG. 8B) in which the ramp 410' is optionally raised from the ground. The ramp 410' optionally includes a beam 430 or other structure for bearing at least part of a load on truss 500' (e.g., during road transport). It should be appreciated that in some embodiments the ramps outboard of the inboard ramp 412 may be omitted, and that in some embodiments the ramp 412 may rest on cribbing, blocks, earth, or other structure or material separate from the truck unloader, or directly on the ground.

Figure 9:
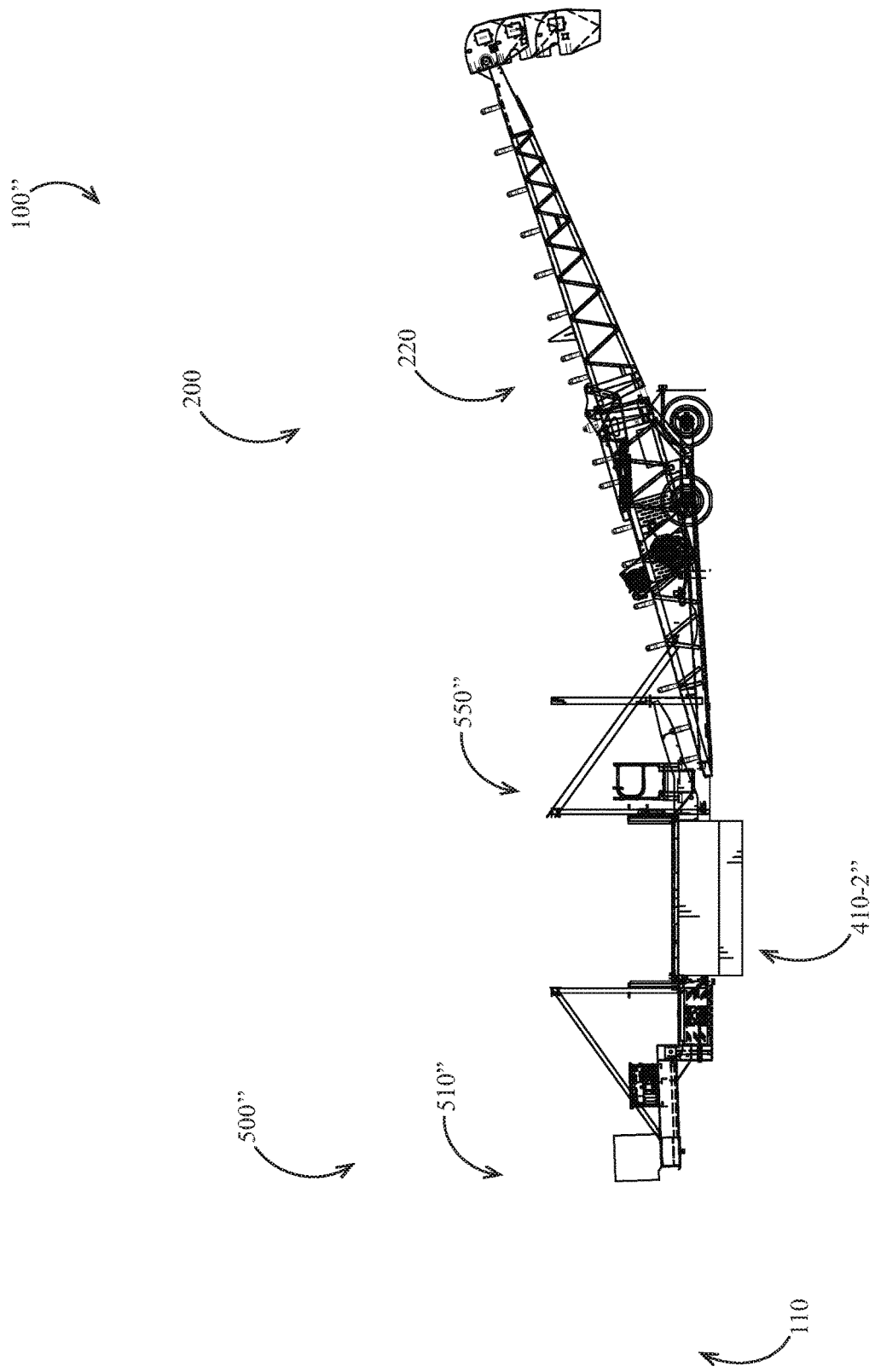
FIG. 9 is a side elevation view of another embodiment of a truck unloader in an operational configuration.

Referring to FIG. 9, another embodiment of a truck unloader 100" is illustrated having a single pair of ramps 410-1", 410-2". The ramps 410" (and/or inboard ramps 412" thereof) are optionally selectively raised into a road transport configuration in which the ramps 410" or a portion thereof bear at least part of the load on truss 500". In some embodiments, in a road transport configuration the ramps 410" optionally transmit a load (e.g., compressive load) from a rear truss section 510" to a forward truss section 550" (e.g., in some embodiments no central truss section is included). As a result, a load path is established from the rear truss section 510", through the ramps 410" and to the forward truss section 550".

In various embodiments, the truck unloaders or other unloader embodiments described herein optionally have one or more functions or features in common with one or more embodiments disclosed in U.S. Pat. No. 8,684,161, incorporated herein by reference.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A material unloader for receiving and conveying material from a vehicle, the material unloader having an operational configuration and a transport configuration, the material unloader comprising:
   a conveyor extending in a generally longitudinal direction;
   a ground frame, the ground frame having at least one opening therethrough, said opening being disposed at least partially above said conveyor;
   a first ramp pivotally coupled to said ground frame and extending in a first lateral direction away from said ground frame in the operational configuration;
   a first actuator configured to pivot the first ramp;
   a second ramp pivotally coupled to said ground frame and extending in a second lateral direction away from said ground frame in the operational configuration, wherein said opening is disposed at least partially laterally between said first and second ramp;
   a second actuator configured to pivot the second ramp;
   a wheel assembly at least partially supporting the ground frame in the transport configuration; and
   a truss supported on said ground frame and disposed at least partially above said ground frame, said truss configured to bear a compressive load in the transport configuration, wherein said first and second ramps are raised in the transport configuration, wherein at least a portion of said first and second ramps form a part of said truss in the transport configuration such that said first and second ramps bear at least a portion of said compressive load in the transport configuration.

2. The material unloader of claim 1, further comprising:
   a grate at least partially supported on said ground frame, wherein said opening extends through said grate.

3. The material unloader of claim 1, further comprising:
   a third ramp pivotally coupled to said ground frame;
   a third actuator configured to pivot the third ramp;
   a fourth ramp pivotally coupled to said ground frame; and
   a fourth actuator configured to pivot the second ramp.

4. The material unloader of claim 1, wherein said first ramp comprises a first support, wherein said second ramp comprises a second support, wherein said first and second support at least partially bear said compressive load in the transport configuration.

5. The material unloader of claim 4, wherein said truss comprises first and second pockets receiving said first support in the transport configuration, and wherein said truss comprises third and fourth pockets receiving said second support in the transport configuration.

6. The material unloader of claim 4, wherein a deflection of said truss in the transport configuration secures said first and second ramp in a raised position.

7. The material unloader of claim 6, wherein in an undeflected condition of said truss the first and second ramps are freely pivoted from the raised position to a lowered position.

8. The material unloader of claim 4, wherein said first and second supports comprise longitudinally extending beams.

9. The material unloader of claim 1, wherein said truss comprises a rear section and a forward section, and wherein said first and second ramps at least partially transmit a load between said rear section and said forward section in the transport configuration.

10. The material unloader of claim 9, wherein said truss further comprises a central section, and wherein said first and second ramps at least partially transmit a load between said central section and said rearward section in the transport configuration.

11. A method of transporting a material unloader, comprising:
    supporting a first vehicle on a ramp in a lowered position;
    folding said ramp upwards to a raised position;
    forming a truss comprising a portion of said ramp;
    supporting a rearward portion of the material unloader on a second vehicle;
    supporting a forward portion of the material unloader on a wheel assembly;
    bearing a compressive load on said portion of said ramp.

12. The method of claim 11, further comprising:
    deflecting said truss by said compressive load such that said portion of said ramp is secured to said truss.

13. A method of reconfiguring a material unloader from an operational configuration to a transport configuration, comprising:
    moving a first ramp generally upwards to a raised position relative to a ground frame;
    moving a second ramp generally upwards to a raised position relative to said ground frame;
    joining said first and second ramps to a truss;
    supporting said ground frame at least partially on a vehicle such that a compressive load is imposed on said truss; and
    bearing at least part of said compressive load on a portion of said first ramp and a portion of said second ramp.

14. The method of claim 13, further comprising:
    deflecting said truss such that said portion of said ramp is secured to said truss.

15. The method of claim 13, further comprising:
    moving a third ramp generally upwards to a raised position relative to said ground frame;
    moving a fourth ramp generally upwards to a raised position relative to said ground frame;
    joining said third and fourth ramps to said truss; and
    bearing at least part of said compressive load on a portion of said third ramp and a portion of said fourth ramp.

\* \* \* \* \*